United States Patent
Jeon et al.

(10) Patent No.: US 8,740,520 B2
(45) Date of Patent: Jun. 3, 2014

(54) MULTI-PURPOSE BEVELLER

(75) Inventors: Byeong-Woo Jeon, Daejeon (KR); Byeong-Gwon Jeon, Daejeon (KR)

(73) Assignee: Dae Sung Golden Technology, Daejeon (KR)

( * ) Notice: Subject to any disclaimer, the term of this patent is extended or adjusted under 35 U.S.C. 154(b) by 1044 days.

(21) Appl. No.: 12/739,391

(22) PCT Filed: Jun. 24, 2008

(86) PCT No.: PCT/KR2008/003600
§ 371 (c)(1),
(2), (4) Date: Jul. 21, 2010

(87) PCT Pub. No.: WO2009/054591
PCT Pub. Date: Apr. 30, 2009

(65) Prior Publication Data
US 2010/0290853 A1    Nov. 18, 2010

(30) Foreign Application Priority Data

Oct. 22, 2007   (KR) ........................ 10-2007-0106058

(51) Int. Cl.
*B23C 3/12* (2006.01)
(52) U.S. Cl.
USPC ................................ 409/138; 408/95; 408/51
(58) Field of Classification Search
CPC ............ B23C 3/13; B23C 3/126; B23C 3/00; B23C 3/02; B23C 1/20; B23C 5/10; B23C 2220/16; B23C 2220/20; B23C 2265/08; B23Q 5/045; B23Q 16/00
USPC ...................................... 409/138; 408/51, 95
See application file for complete search history.

(56) References Cited

U.S. PATENT DOCUMENTS

| 4,567,802 A | 2/1986 | Witherspoon |
| 6,179,302 B1 * | 1/2001 | Gauthier et al. ................. 279/75 |
| 6,368,032 B1 | 4/2002 | Chen |
| 7,029,212 B2 * | 4/2006 | Adkins et al. ................. 409/180 |
| 7,082,656 B1 * | 8/2006 | Duncan et al. ................. 29/33 T |

FOREIGN PATENT DOCUMENTS

EP    0493580 A1    7/1992

* cited by examiner

*Primary Examiner* — David Bryant
*Assistant Examiner* — Moshe Wilensky
(74) *Attorney, Agent, or Firm* — Rabin & Berdo, P.C.

(57) ABSTRACT

There is provided a beveller for processing an edge of a member to be processed into a slanted surface (a bevel), and, more particularly, to a multi-purpose beveller which improves a level of completion of bevel process through thoroughly processes an edge positioned at a corner by using a beveling tool for a corner mounted onto the beveller and which expands the application fields of the beveller through processing a curved section by simply replacing a rotary cutter for a corner coupled to an adapter with a cutter for a curved section. The present invention is realized by providing the technique of thoroughly processing an edge deeply positioned at a corner by selectively mounting a beveling tool for a right angled corner or a beveling tool for an acute angled corner onto the beveller, the technique of smoothly processing an edge in a corner section by sequentially separating the beveling tool for a corner and a rotary cutter for a corner coupled to an adapter and thereafter coupling a new rotary cutter for a curved section to the adapter, and the technique of applying the beveling tool for a right angled corner and the beveling tool for an acute angled corner to processing an edge in a straight-line section.

7 Claims, 8 Drawing Sheets

MULTI-PURPOSE BEVELLER

TECHNICAL FIELD

The present invention relates to a beveller for processing an edge of a member to be processed into a slanted surface (a bevel), and, more particularly, to a multi-purpose beveller which improves a level of completion of bevel process through thoroughly processes an edge positioned at a corner by using a beveling tool for a corner mounted onto the beveller and which expands the application fields of the beveller through processing a curved section by simply replacing a rotary cutter for a corner coupled to an adapter with a cutter for a curved section.

BACKGROUND ART

In general, a bevel process is to chamfer a sharp edge portion of steel, nonferrous material or resin material. The bevel process is typically performed as a final process in processing a product. Since the quality of a beveled edge determines the quality of a product, the bevel process needs special attention to obtain the slanting surface which is maximized in surface flatness level to be clear and clean like a mirror.

In the bevel process, when a motor is driven by an electric or air power and a cutting tip is rotated by a driving force of the motor, a beveller operates to process an edge of a member to be processed into a slanted surface.

The relevant prior art of beveller has been presented in Korean Patent No. 575201 entitled "Beveller capable of easily controlling the extent to be beveled" and Korean Patent No. 644400 entitled "Beveling unit for straight-line section in beveller", both filed by the same applicant of the present invention.

The aforementioned prior art will be briefly described: In the former, a unit for controlling the extent to be beveled is movably slid to be temporarily released from a locking state and is rotated to be adjusted to a divided beveling scale. In this simple manner, the extent to be beveled is finely and accurately controlled without any restriction, thereby improving the quality of the bevel process. In addition, the unit for controlling the extent to be beveled accurately maintains the predetermined extent to be beveled. Therefore, this prior art has the useful effect in that the quality of the bevel process is consistently uniform.

In the latter, a bevel process is performed in a straight-line section as well as a basic curved section by using a beveling tool for a straight-line section selectively mounted onto a support holder. When the bevel process is performed in the straight-line section, an angle of rotation of a straight-line guide is freely controlled with a fine range. Therefore, in this prior art, a worker is able to hold the beveller in the most comfortable position to perform the bevel process.

DISCLOSURE OF INVENTION

Technical Problem

However, despite of the useful effects, the aforementioned prior art has the problems to be more or less improved. Only when the problems are solved, the completion level and quality of the bevel process could be improved and the application fields of the bevel process could be further expanded.

That is, in all bevellers including the aforementioned prior art, as illustrated in FIG. 13, a guide roller 1 which is installed at a lower end of a rotary cutting unit cannot deeply approach to a corner 3 formed in a member 2 to be processed. Therefore, since it is impossible to completely bevel the edge positioned in the corner 3, a conventional beveller has the problem in that the level of completion and quality of the bevel process are lowered.

Moreover, since the conventional beveller is incapable of integrally processing the edges in the straight-line section and the curved section line including the corner section, the efficiency of the beveller equipment decreases and the application fields thereof are limited.

Technical Solution

Therefore, the present invention has been made to solve the above problems, and it is an aspect of the present invention to provide a multi-purpose beveller with a technique of thoroughly processing an edge deeply positioned at a corner by selectively mounting a beveling tool for a right angled corner or an acute angled corner onto the beveller, a technique of smoothly processing an edge in a corner section by sequentially separating the beveling tool for a corner and a rotary cutter for a corner coupled to an adapter and thereafter coupling a new rotary cutter for a curved section to the adapter, and a technique of applying the beveling tool for a right angled corner and the beveling tool for an acute angled corner to processing an edge in a straight-line section.

Advantageous Effects

In accordance with the present invention, a rotary cutter for a corner is coupled to an adapter assembled with a power shaft simultaneously with a beveling tool for a right angled corner or an acute angled corner mounted onto a beveller. Accordingly, an edge positioned at a deep and narrow corner is thoroughly processed to be a slanted surface, thereby improving the level of completion and quality of a bevel process.

Furthermore, when beveling an edge in a curved section, the beveling tool for a corner is separated and replaced in a simple manner, thereafter, the rotary cutter for a curved section is mounted onto the adapter, thereby enabling to dedicatedly process the edge in the curved section.

Furthermore, the respective beveling tools for a right angled corner and an acute angle corner are used to dedicatedly process an edge in a long straight-line section. Accordingly, the efficiency of the beveller equipment is improved and the application fields and use of the bevel process are additionally expanded.

BRIEF DESCRIPTION OF THE DRAWINGS

These and other aspects and advantages of the present invention will become apparent and more readily appreciated from the following description of the embodiments, taken in conjunction with the accompanying drawings, in which.

EXPLANATION ON ESSENTIAL ELEMENTS OF DRAWINGS

Figure 1:
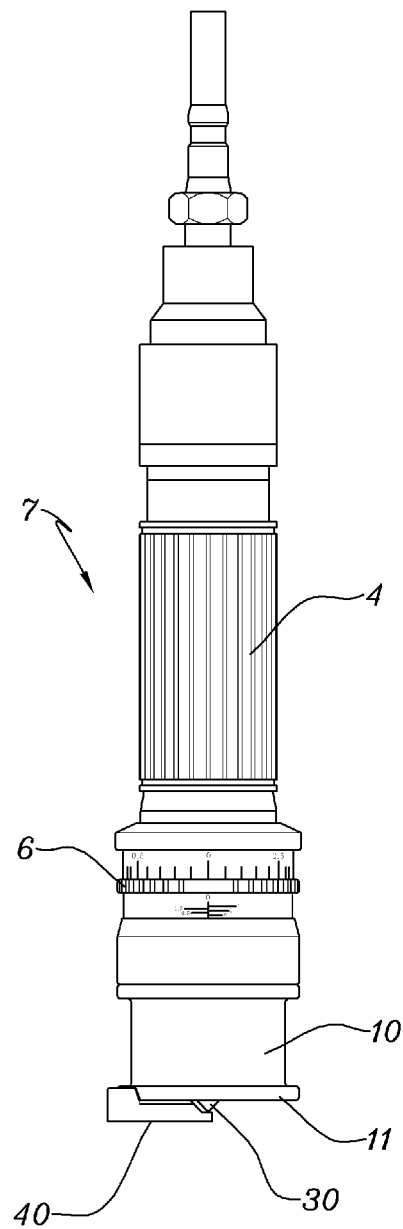
FIG. 1 is a front view illustrating a multi-purpose beveller according to an embodiment of the present invention.

2: member 3: corner
5: power shaft 10: support holder
13: coupling aperture 20: adapter
21: insertion aperture 23: tool aperture
24: setscrew 30: rotary cutter for a corner
40: beveling tool for a right angled corner
43: support protrusions 44: two sides
50: beveling tool for an acute angled corner
60: rotary cutter for a curved section
61: securing shaft

MODE FOR THE INVENTION

Hereinafter, embodiments of the present invention will be described in detail with reference to the accompanying drawings.

Figure 2:
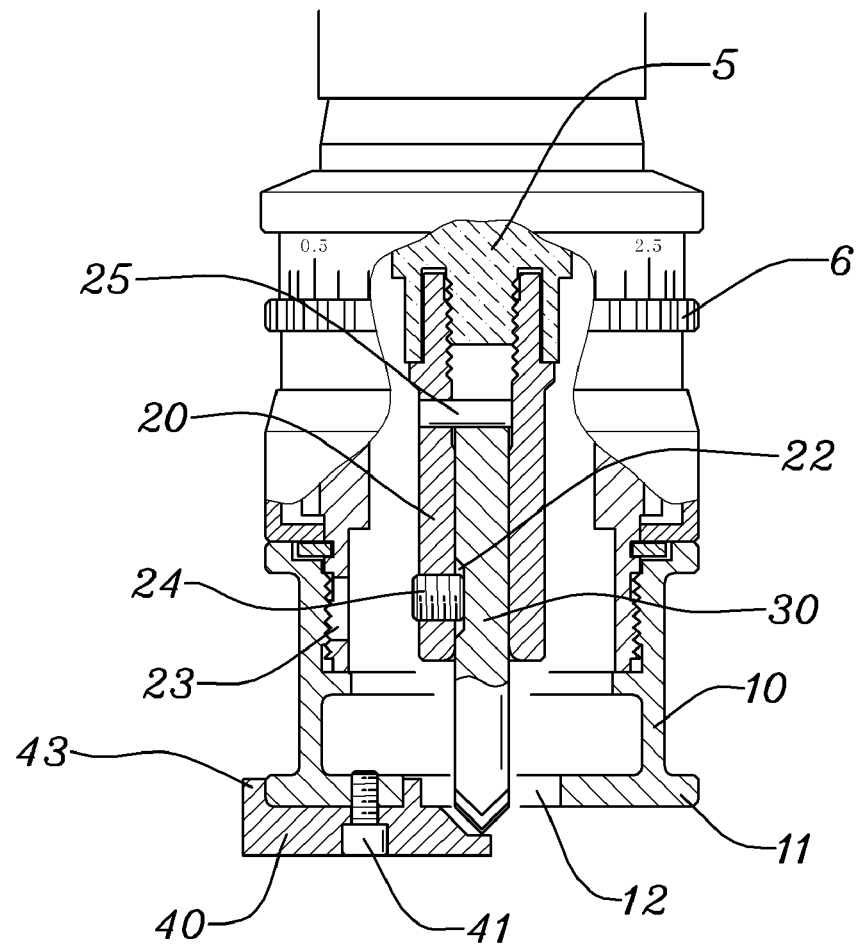
FIG. 2 is a vertical sectional view being partially cut, illustrating an internal structure of the beveller.

The overall constitution of a multi-purpose beveller according to a preferred embodiment of the present invention will be described with reference to FIGS. 1 through 3.

Figure 9:
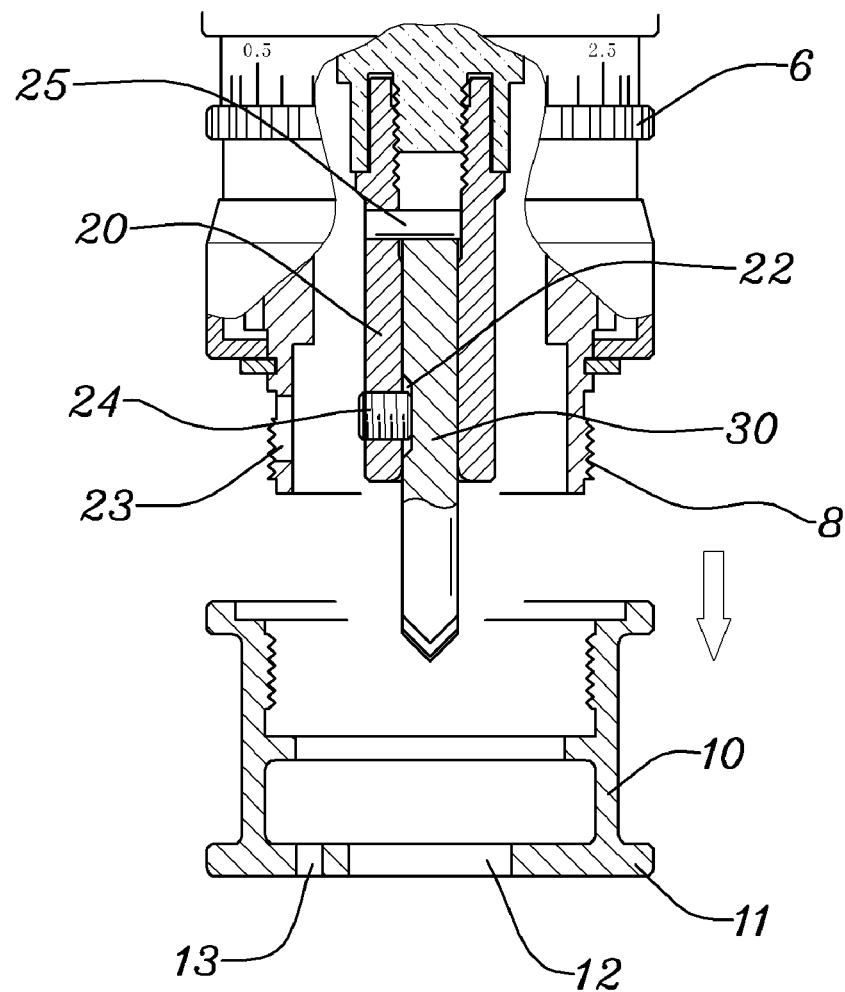
FIG. 9 is a vertical sectional view illustrating the support holder being separated.
Figure 10:
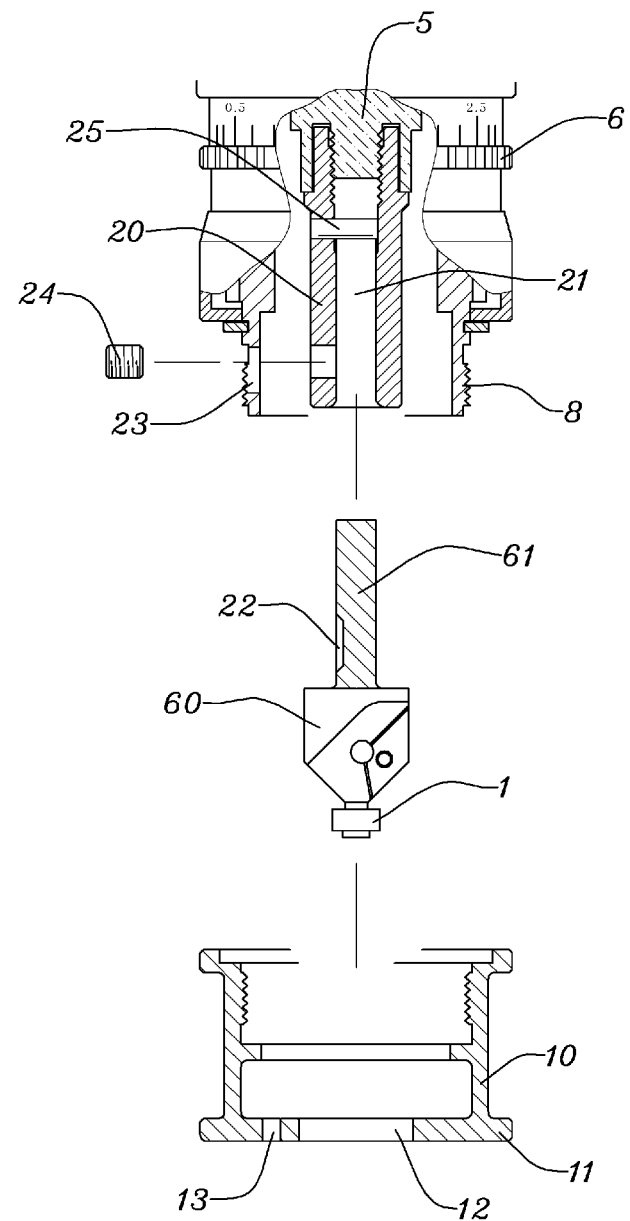
FIG. 10 is a vertical sectional view illustrating a rotary cutter for a curved section which is being fitted to an adapter.

The present invention has the constitution comprising: a support holder 10 coupled to a beveller 7 and including a coupling aperture 13 (indicated in FIG. 9) formed at a guide plate 11; an adapter 20 coupled to a power shaft 5 of the beveller 7 and including an insertion aperture 21 (indicated in FIG. 10) formed in the center of the adapter 20; a rotary cutter for a corner 30 fitted into the insertion aperture 21; and a beveling tool for a right angled corner 40. The beveling tool for a right angled corner 40 is mounted onto the guide plate 11 by a screw through a securing aperture 41 coupled to the coupling aperture 13. Further, the beveling tool for a right angled corner 40 includes support protrusions 43 and an interference prevention unit 45. The support protrusions 43 are secured to an inner surface of a cutter exposure aperture 12 and an outer surface of the guide plate 11 formed in a concentric circle shape on the top surface of the beveling tool for a right angled corner 40. The interference prevention unit 45 is formed at the intersection of two side 44 forming right angle.

The present invention in the above-described schematic constitution will be described in more detail, to be easily embodied.

Figure 11:
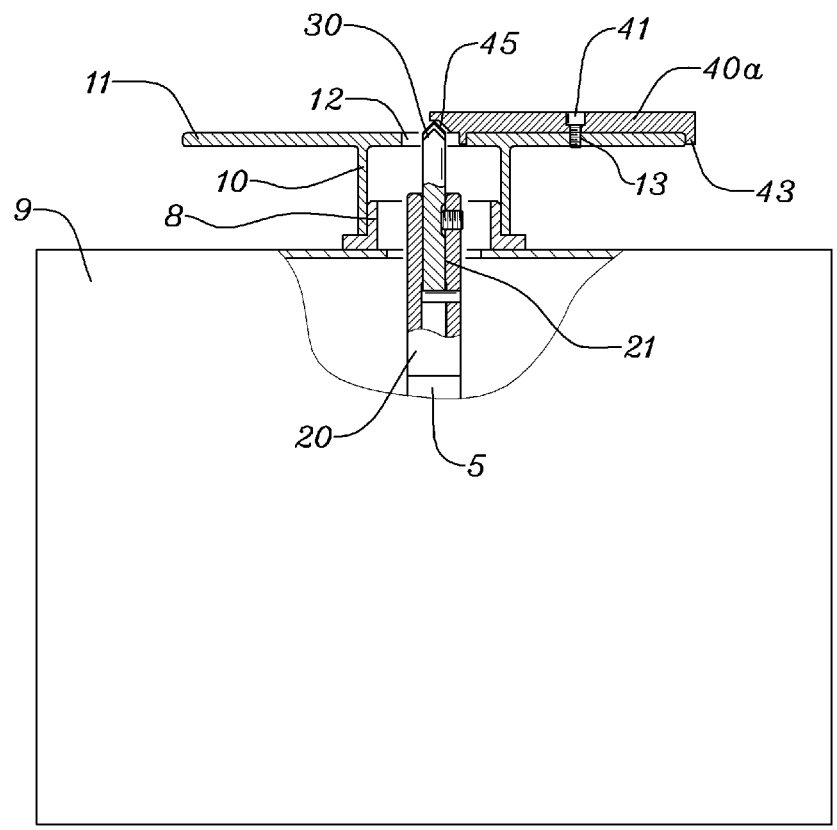
FIG. 11 is a vertical sectional view illustrating the multi-purpose beveller applied in a desk-type.
Figure 12:
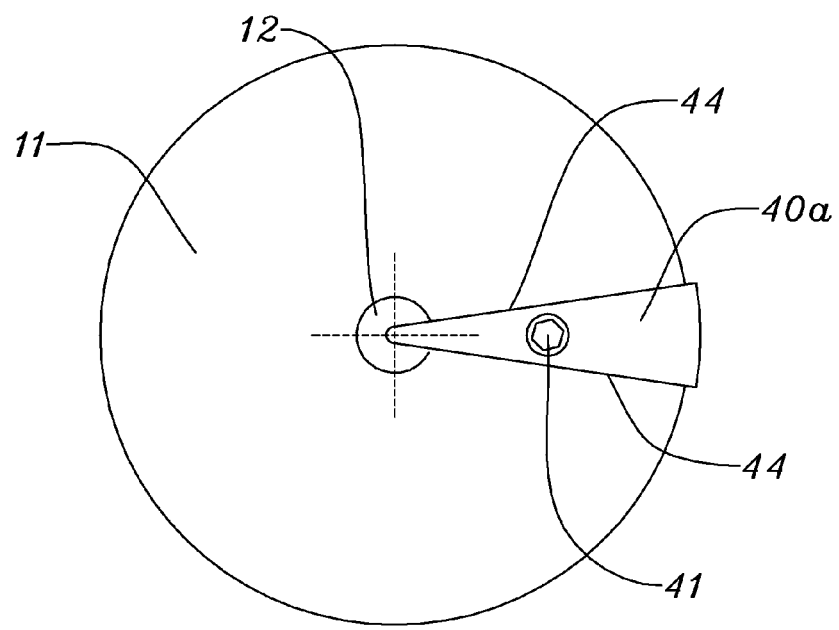
FIG. 12 is a plan view illustrating the beveling tool for a corner which is installed in the desk-type beveller.
Figure 13:
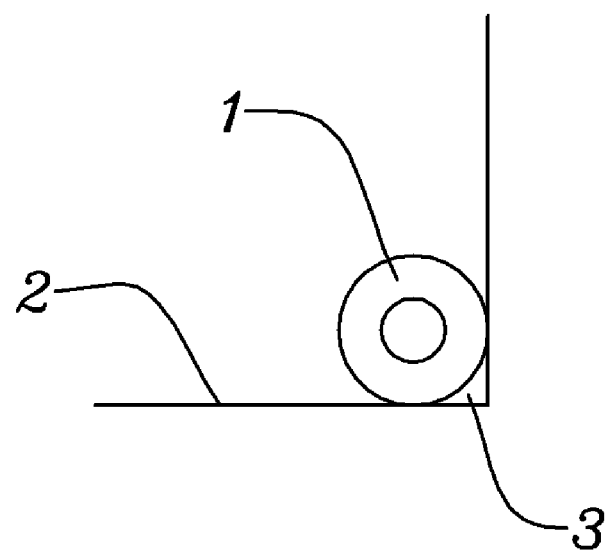
FIG. 13 is a view illustrating an example of a conventional guide roller being positioned at a corner of a member to be processed.

The present invention processes an edge of a member 2 to be processed by operating a rotary cutter using rotation power of the power shaft 5 which is installed inside a beveller handle 4 and is operated by high-pressure air is correlatively applied to the beveller 7 which is the invention earlier registered by the same inventor of the present invention. Further, the beveller 7 controls the extent to be beveled through one touch by rotating a unit for controlling the extent to be beveled 6. However, the present invention is not limited to the beveller 7. The present invention may be further used in a general beveller not disclosed in this application or used in combination with a desk-type beveller 9 as shown in FIG. 11.

The support holder 10 is detachably coupled to a coupling end 8 (indicated in FIG. 9) formed in the beveller 7, using a screw. The guide plate 11 is formed in the support holder 10. The cutter exposure aperture 12 is formed at the center of the guide plate 11, to expose a rotary cutter for a corner 30 and a rotary cutter for a curved section 60 outwardly. The coupling aperture 13 is formed on the guide plate 11, to selectively mount a beveling tool for a right angled corner 40 or a beveling tool for an acute angled corner 50.

Figure 4:
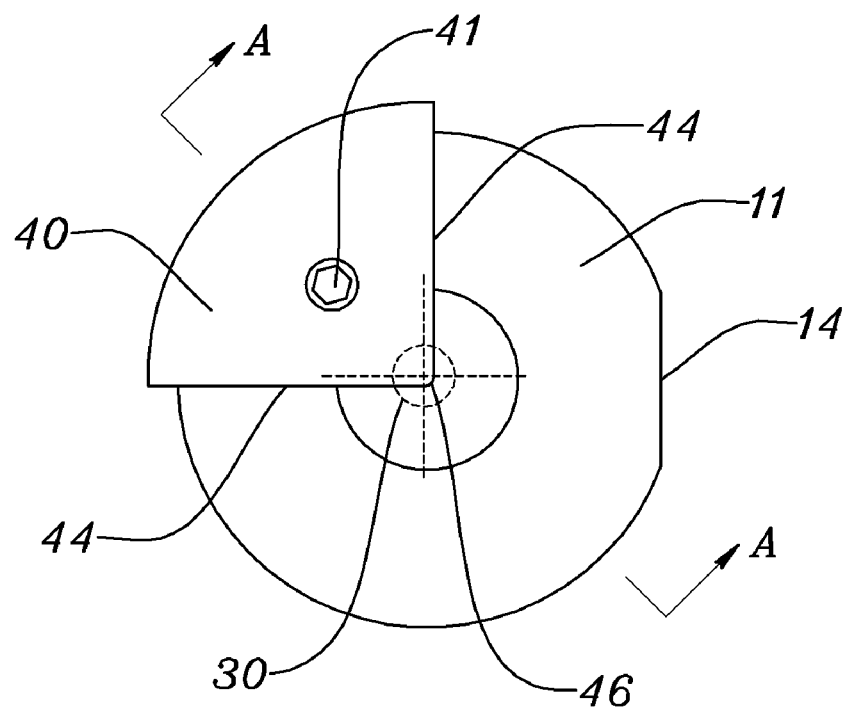
FIG. 4 is a bottom view illustrating the beveling tool for a right angled corner which is mounted onto a support holder.
Figure 5:
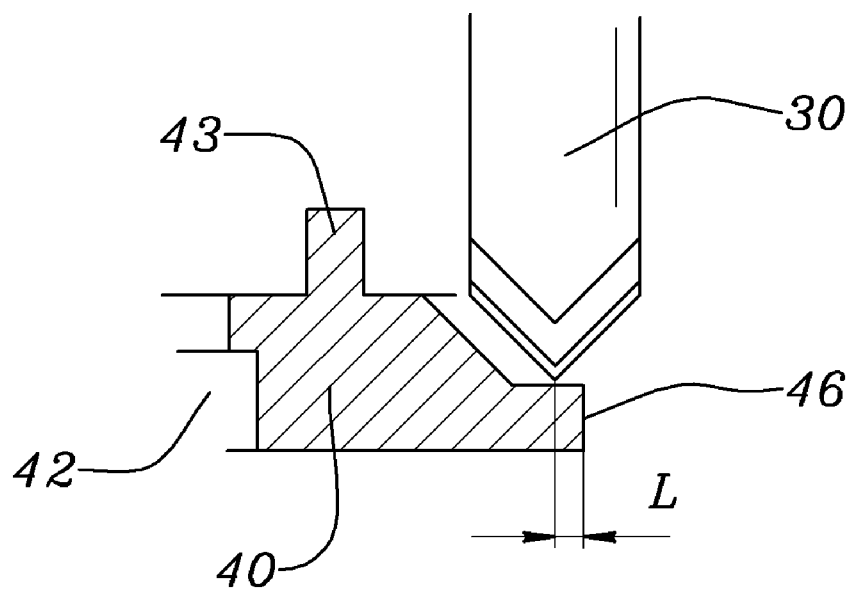
FIG. 5 is a sectional view taken along line A-A of FIG. 4.

When a bevel process in a straight-line section is performed while the beveling tool for a right angled corner 40 is mounted, a reference edge 14, providing a reference point in accordance with a bevel process progressing direction, which is formed at one side of the guide plate 11 parallel to the side 44 of the beveling tool for a right angled corner 40 as shown in FIG. 4 provides the convenience for the bevel process.

The adapter 20 including the insertion aperture 21 formed in the center of the adapter 20 is integrally coupled to the power shaft 5 installed to rotate inside the beveller 7, using a screw. Through selecting the rotary cutter for a corner 30 or the rotary cutter for a curved section 60 and fitting the selected one into the insertion aperture 21, dedicated processes of edges in the curved section as well as the corner of the member 2 are possible.

The rotary cutter for a corner 30 comprises a circular shaft and a cutting part which uses a well-known rotary cutter with a sharp angular cutting blade. The rotary cutter for a curved section 60 comprises a securing shaft 61 formed at its upper part and uses a well-known rotary cutter with a guide roller 1 positioned at its lower end. However, an additional securing unit is correlatively included so that the rotary cutter for a curved section 60 can be selectively fitted into the adapter 20.

For this purpose, securing concave grooves 22 are formed recessed respectively on an outer circumferential surface of the rotary cutter for a corner 30 and an outer circumferential surface of the securing shaft 61. The securing concave groove 22 securely receives a setscrew 24 to be coupled to the adapter 20 by a screw through a tool aperture 23 formed on the coupling end 8. Accordingly, the rotary cutter for a corner 30 or the rotary cutter for a curved section 60 is inserted into the insertion aperture 21 of the adapter 20 and maintains the assembled state without any movement. Specifically, the tool aperture 23 not only provides an insertion space for a tool (for example, hexagonal wrench or the like) to adjust the setscrew 24 but also provides a movement path through which the setscrew 24 passes.

Further, a stopper pin 25 passing through the insertion aperture 21 is installed at upper one part of the adapter 20 to prevent the excessively deep insertion of the rotary cutter for a corner 30 or the rotary cutter for a curved section 60 into the insertion aperture 21. Further, the stopper pin 25 performs the function of maintaining the lower ends of the rotary cutter for a corner 30 and the rotary cutter for a curved section 60 to be always at a regular position, not to change the extent to be beveled even though the rotary cutter is replaced.

The core technique of the present invention is the beveling tool for a right angled corner 40 mounted onto the guide plate 11 of the support holder 10 which has the correlative constitution with the rotary cutter for a corner 30 to thoroughly process an edge deeply positioned at a corner 3 formed by right angle in the member 2 to be processed.

Figure 3:
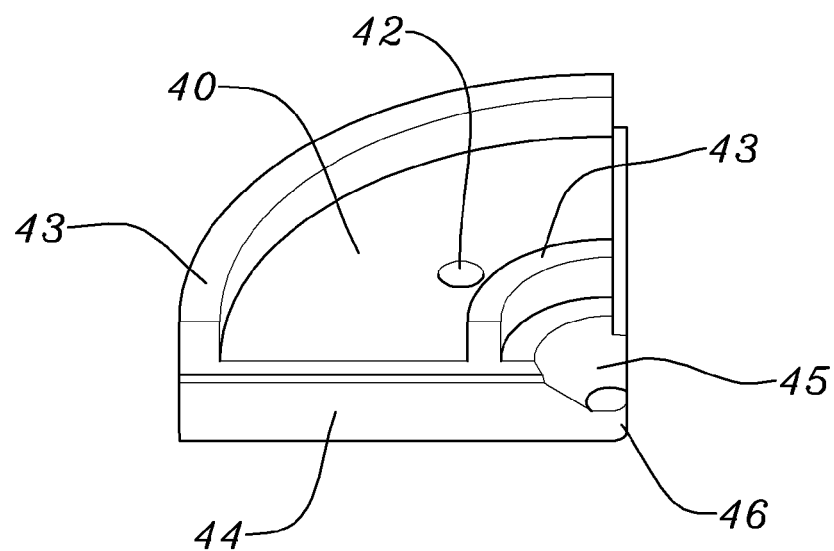
FIG. 3 is a perspective view illustrating a beveling tool for a right angled corner in the beveller.

For this purpose, as illustrated in FIGS. 3 and 4, the beveling tool for a right angled corner 40 is mounted onto the guide plate 11 by a screw passing through a through-aperture 42 of the securing aperture 41 coupled to the coupling aperture 13 of the guide plate 11. On the top surface of the beveling tool for a right angled corner 40, the support protrusions 43 which are supported to be secured respectively to the inner surface of the cutter exposure aperture 12 and the outer surface of the guide plate 11 formed in a concentric circle shape are spaced apart form each other. The interference prevention unit 45 which prevents the beveling tool for a right angled corner 40 from interfering with the rotary cutter for a corner 30 is formed recessed at the intersection of two sides 44 forming right angle.

Figure 6:
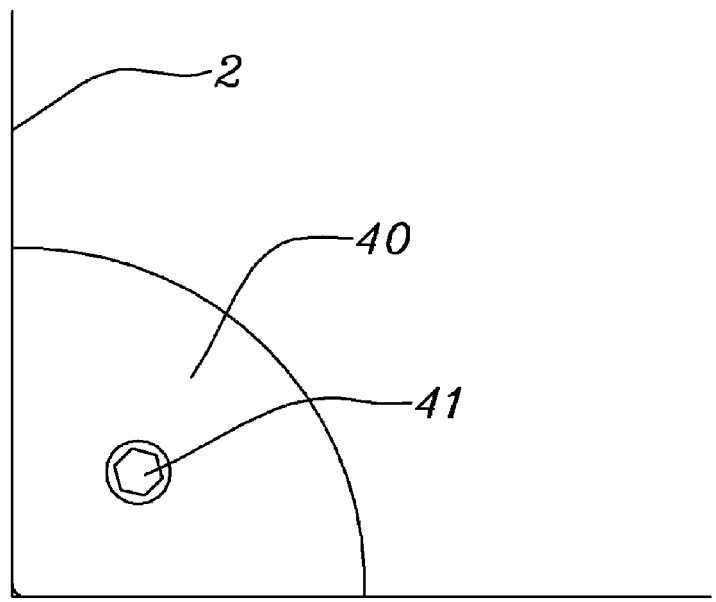
FIG. 6 is a bottom view illustrating the beveling tool for a right angled corner which is fitted into the right angled corner.

Therefore, as illustrated in FIG. 6, the beveling tool for a right angled corner 40 is fitted into the corner 3 formed at right angles in the member 2 to be processed, thereby dedicatedly and thoroughly processing the edge positioned in the corner 3.

Figure 8:
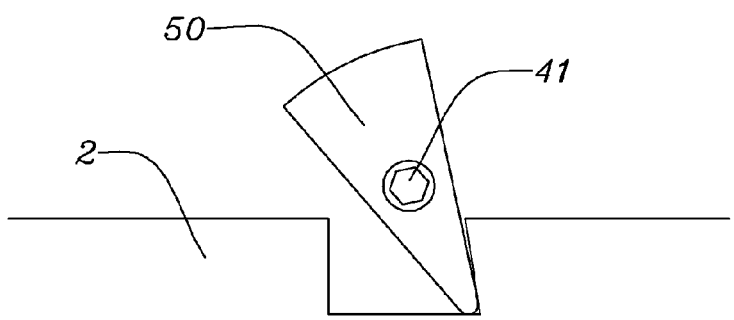
FIG. 8 is a bottom view illustrating the beveling tool for an acute angled corner which is fitted into the acute angled corner.

Furthermore, in the present invention, as illustrated in FIG. 8, the beveling tool for an acute angled corner 50 is mounted onto the guide plate 11 by a screw through the securing aperture 41 coupled to the coupling aperture 13 of the guide plate 11, to thoroughly process an edge deeply positioned in the corner 3 formed at acute angles in the member 2 to be processed.

On the top surface of the beveling tool for an acute angled corner 50, the support protrusions 43 are supported to be secured respectively to the inner surface of the cutter exposure aperture 12 and the outer surface of the guide plate 11 formed in a concentric circle shape. The interference prevention unit 45 is formed recessed at the intersection of two sides 44 of the beveling tool for an acute angled corner 50. Unlike the beveling tool for a right angled corner 40, the two sides 44 of the beveling tool for an acute angled corner 50 meet at acute angle.

Accordingly, the beveling tool for an acute angled corner 50 fitted into the narrow corner 3 formed at acute angles in the member 2 to be processed is capable of dedicatedly and thoroughly processing the edge positioned at the corner 3.

The beveling tool for a right angled corner 40 and the beveling tool 50 for an acute angled corner 50 have the same constitution but the two sides 44 of the each beveling tool meet at different angle. Both beveling tool for a right angled corner 40 and an acute angled corner 50 are usable to process an edge in the straight-line section when any one of the two sides 44 is fitted into the straight-line section of the member 2 to be processed.

Figure 7:
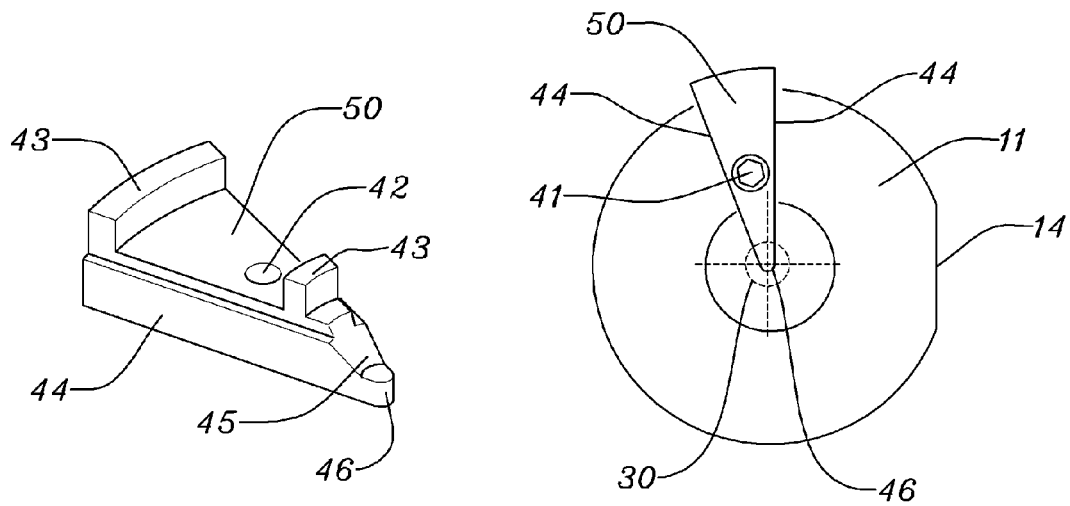
FIG. 7 is a perspective view illustrating a beveling tool for an acute angled corner and a bottom view illustrating the beveling tool for an acute angled corner which is mounted onto the support holder.

The beveling tool for a right angled corner 40 and the beveling tool for an acute corner 50 further comprise a round side 46 at a front end of the intersection of the two sides 44, as illustrated in FIG. 3 and FIG. 7. The round side 46 is formed to protrude by a predetermined distance L outwardly from a blade edge of a center part of the rotary cutter for a corner 30.

As the round side 46 is closely fitted into the side of the member 2 to be processed, the cutting blade positioned perpendicular to the round side 46 becomes a start point of the bevel process. Accordingly, if the round side 46 is positioned at the same position as that of the blade edge of the center part of the rotary cutter for a corner 30, the bevel process is not smoothly performed. Therefore, to prevent the bevel process from being not smoothly performed, the round side 46 is formed to protrude by the predetermined distance L from the blade edge of the center part of the rotary cutter for a corner 30.

Meanwhile, the present invention is not limited to the processing of the edge in the corner or straight-line section of the member 2 to be processed. After removing all the beveling tool for a right angled corner 40 or the beveling tool for an acute angled corner 50, a rotary cutter for a curved section 60 may replace the rotary cutter for a corner 30 and be assembled, to smoothly process an edge in the curved section.

For this purpose, the securing shaft 61 of the rotary cutter for a curved section 60 is inserted into the insertion aperture 21. The securing concave groove 22 is formed on the outer circumferential surface of the securing shaft 61. The setscrew 24 to be screw-coupled to the adapter 20 is inserted into the securing concave groove 22 through the tool aperture 23 formed at the coupling end 8 coupled to the support holder, and is fixed by a screw. Accordingly, when the guide plate 11 is secured to the top surface of the member 2 to be processed, the rotary cutter for a curved section 60 moves along the curved section and dedicatedly processes the edge in the curved section, thereby expanding the application fields of the beveller.

Furthermore, the present invention is applicable to the desk-type beveller 9 as previously mentioned. In light of the structural characteristics of the desk-type beveller 9, a support holder 10, an adapter 20, a rotary cutter for a corner 30 and a beveling tool for a corner 40a are installed upwardly. In this case, since the beveling tool for a corner 40a is in the sight of the worker, it is very easy to perform the bevel process.

That is, the support holder 10 including a coupling aperture 13 formed on the top surface of a guide plate 11 is coupled to a coupling end 8 installed on the desk-type beveller 9. Although not shown in the drawings, the support holder 10 and the coupling end 8 are coupled by passing each other through another coupling aperture to be coupled to each other, thereby maintaining a firmer coupling state.

The adapter 20 including an insertion aperture 21 formed in the center of the adapter 20 is integrally formed on an upper part of a power shaft 5 installed in the desk-type beveller 9. The rotary cutter for a corner 30 is fixedly fitted into the insertion aperture 21. The beveling tool for a corner 40a having right angle or acute angle is mounted onto the top surface of the guide plate 11, through a securing aperture 41. Support protrusions 43 are formed secured to an inner surface of a cutter exposure aperture 12 and an outer surface of the guide plate 11 in a concentric circle shape, on the bottom surface of the beveling tool for a corner 40a. An interference prevention unit 45 is formed at the intersection of two sides 44 of the beveling tool for a corner 40a. Based on this constitution, the general desk-type beveller 9 is converted into the multi-purpose beveller, to increasingly improve the performance of the beveller.

The invention claimed is:
1. A multi-purpose beveller comprising:
a support holder coupled to a beveller and including a coupling aperture formed in a guide plate;
an adapter coupled to a power shaft of the beveller and including an insertion aperture formed in a center of the adapter;
a rotary cutter fixedly fitted into the insertion aperture; and
a beveling tool including an upper surface that faces both the guide plate and the rotary cutter, a lower surface opposite to the upper surface, and a through aperture penetrating the beveling tool from the lower surface to the upper surface, the beveling tool being mounted to the guide plate by a screw that passes through the through aperture of the beveling tool and the coupling aperture of the guide plate, the beveling tool including two sides that form a right angle, the beveling tool further including support protrusions and an interference prevention unit, wherein the support protrusions are formed secured to an inner surface of a cutter exposure aperture and an outer surface of the guide plate in a concentric circle shape on the top surface of the beveling tool and the interference prevention unit is located at the intersection of the two sides, and wherein, at a front end of the intersection of the two sides, a round side is formed to protrude outwardly from a blade edge of a center part of the rotary cutter, such that an imaginary line extended from the blade edge in an axial direction of the rotary cutter, comes in contact with the upper surface of the beveling tool.

2. The multi-purpose beveller according to claim 1, wherein the rotary cutter includes a securing concave groove on the outer circumferential surface thereof, and a setscrew screw-coupled to the adapter through a tool aperture formed on a coupling end screw-coupled to the support holder is inserted and fixed at the securing concave groove.

3. The multi-purpose beveller according to claim 1, wherein, at an upper portion of the top of the adapter, a stopper pin passing through the insertion aperture is installed to restrict the insertion of the rotary cutter and maintain a regular position of the rotary cutter.

4. A multi-purpose beveller comprising:
a support holder coupled to a beveller and including a coupling aperture formed in a guide plate;
an adapter coupled to a power shaft of the beveller and including an insertion aperture formed in a center of the adapter;
a rotary cutter fixedly fitted into the insertion aperture; and
a beveling tool including an upper surface that faces both the guide plate and the rotary cutter, a lower surface opposite to the upper surface, and a through aperture penetrating the beveling tool from the lower surface to the upper surface, the beveling tool being mounted to the guide plate by a screw that passes through the through aperture of the beveling tool and the coupling aperture of the guide plate, the beveling tool including two sides that form an acute angle, the beveling tool further including support protrusions and an interference prevention unit,
wherein the support protrusions are formed secured to an inner surface of a cutter exposure aperture and an outer surface of the guide plate in a concentric circle shape on the top surface of the beveling, and the interference prevention unit is located at the intersection of the two sides, and wherein, at a front end of the intersection of the two sides, a round side is formed to protrude outwardly from a blade edge of a center part of the rotary cutter, such that an imaginary line extended from the blade edge in an axial direction of the rotary cutter, comes in contact with the upper surface of the beveling tool.

5. The multi-purpose beveller according to claim 4, wherein the rotary cutter includes a securing concave groove on the outer circumferential surface thereof, and a setscrew screw-coupled to the adapter through a tool aperture formed on a coupling end screw-coupled to the support holder is inserted and fixed at the securing concave groove.

6. The multi-purpose beveller according to claim 4, wherein, at an upper portion of the top of the adapter, a stopper pin passing through the insertion aperture is installed to restrict the insertion of the rotary cutter and maintain a regular position of the rotary cutter.

7. A multi-purpose beveller comprising:
a support holder connected to a top of a desk-type beveller and including a coupling aperture formed in a guide plate;
an adapter formed at an upper part of a power shaft of the desk-type beveller and including an insertion aperture formed in a center of the adapter;
a rotary cutter fixedly fitted into the insertion aperture; and
a beveling tool including an upper surface that faces both the guide plate and the rotary cutter, a lower surface opposite to the upper surface, and a through aperture penetrating the beveling tool from the lower surface to the upper surface, the beveling tool being mounted to the guide plate by a screw that passes through the through aperture of the beveling tool and the coupling aperture of the guide plate, the beveling tool including two sides that form an acute angle, the beveling tool further including support protrusions and an interference prevention unit,
wherein the support protrusions are formed secured to an inner surface of a cutter exposure aperture and an outer surface of the guide plate in a concentric circle shape on the bottom surface of the beveling tool, and the interference prevention unit is located at the intersection of the two sides, and wherein, at a front end of the intersection of the two sides, a round side is formed to protrude outwardly from a blade edge of a center part of the rotary cutter, such that an imaginary line extended from the blade edge in an axial direction of the rotary cutter, comes in contact with the upper surface of the beveling tool.

\* \* \* \* \*